(12) United States Patent
Langenegger et al.

(10) Patent No.: US 7,073,657 B2
(45) Date of Patent: Jul. 11, 2006

(54) CONVEYING ARRANGEMENT FOR PROCESSING PRINTED PRODUCTS

(75) Inventors: Daniel Langenegger, Brittnau (CH); Hansjörg Schneeberger, Brittnau (CH)

(73) Assignee: Muller Martini Holding AG, Hergiswil (CH)

( * ) Notice: Subject to any disclaimer, the term of this patent is extended or adjusted under 35 U.S.C. 154(b) by 0 days.

(21) Appl. No.: 10/658,377

(22) Filed: Sep. 10, 2003

(65) Prior Publication Data

US 2004/0050657 A1    Mar. 18, 2004

(30) Foreign Application Priority Data

Sep. 13, 2002    (EP) .................................. 02405801

(51) Int. Cl.
*B65G 43/00* (2006.01)
(52) U.S. Cl. .............. 198/460.1; 198/465.3; 198/594; 414/331.04
(58) Field of Classification Search ............ 198/460.1, 198/460.2, 465.3, 594; 414/331.04, 416.04
See application file for complete search history.

(56) References Cited

U.S. PATENT DOCUMENTS

| | | | | |
|---|---|---|---|---|
| 2,897,772 A * | 8/1959 | Hunter | ........................ | 99/352 |
| 3,911,593 A | 10/1975 | Colapinto | | |
| 4,881,357 A * | 11/1989 | Ballestrazzi et al. | ........... | 53/64 |
| 4,964,498 A * | 10/1990 | Klingl | ...................... | 198/347.1 |
| 5,253,743 A * | 10/1993 | Haas et al. | .............. | 198/347.1 |
| 5,277,297 A * | 1/1994 | Tolson | ..................... | 198/626.5 |
| 5,473,978 A * | 12/1995 | Colombo | .................. | 99/443 C |
| 6,223,881 B1 * | 5/2001 | Carle | ...................... | 198/347.3 |
| 6,321,138 B1 * | 11/2001 | Livesay et al. | ............. | 700/245 |
| 6,629,593 B1 * | 10/2003 | Zeitler | ..................... | 198/460.1 |
| 6,715,598 B1 * | 4/2004 | Affaticati et al. | ........... | 198/357 |
| 6,751,524 B1 * | 6/2004 | Neary et al. | ................ | 700/230 |
| 6,846,145 B1 * | 1/2005 | Remericq | ............. | 414/331.04 |

FOREIGN PATENT DOCUMENTS

| | | |
|---|---|---|
| DE | 38 29 355 A1 | 7/1989 |
| EP | 0 888 994 A1 | 1/1999 |
| EP | 0 957 055 A2 | 11/1999 |
| FR | 1 591 532 A | 4/1970 |
| GB | 1 530 981 A | 11/1978 |

\* cited by examiner

*Primary Examiner*—Joe Dillon, Jr.
(74) *Attorney, Agent, or Firm*—Venable LLP; Robert Kinberg

(57) ABSTRACT

A conveying arrangement for processing printed products, comprising a conveying section, a plurality of deposit trays on which the printed products are transported along the conveying section, the conveying section having an intake area where the printed products are fed to the deposit trays and a delivery area at an end region of the conveying section where the printed products are removed from the deposit trays, and a control mechanism for controlling a distance between respectively adjacent deposit trays in the intake area based on a thickness of the printed products.

14 Claims, 6 Drawing Sheets

CONVEYING ARRANGEMENT FOR PROCESSING PRINTED PRODUCTS

CROSS-REFERENCE TO RELATED APPLICATION

This application claims the priority of European Patent Application Serial No. 2405801.8-1256, filed on Sep. 13, 2002, the subject matter of which is incorporated herein by reference.

BACKGROUND OF THE INVENTION

The invention relates to a conveying arrangement for processing printed products. The arrangement has an intake area where the printed products are fed to a conveying section, a plurality of deposit trays on which the printed products are transported along the conveying path and a delivery area at the end of the conveying path where the printed products are conveyed off.

During the processing, the printed products can be transported from one processing station to another with conveying arrangements of the aforementioned type. The printed products can be any type including, for example, perfect bound or thread-stitched book blocks, loose book stacks, loose sheets or brochures. In the processing stations, the printed products are stitched together, applied with glue or trimmed. For conventional perfect binding systems, conveying arrangements can supply to a trimming machine book blocks with glue applied to the spine. In the process of applying glue to the spine(s) of book blocks, loose sheet stacks can be bound together with heated adhesive (i.e., liquid glue) to form a magazine or book. The heated adhesive is then allowed to cool down or dry and harden considerably to reach a desired cutting firmness/consistency before the perfect-bound magazine or book can be moved to the next processing step, in particular to a side trimming station. To provide the required cooling time and/or drying time, the printed products in conventional perfect binding systems are transported with conveying belts over a specified cooling horizontal section after the binding operation. While on the cooling section, the adhesive hardens or cools down until it reaches the desired cutting or trimming firmness, wherein the cooling occurs at, for example, room temperatures.

Horizontal cooling sections can be several meters long, or even larger to ensure the necessary cooling time, and occupy large space. For that reason, cooling sections are often designed as towers to occupy considerably less space than horizontal cooling sections. The following designs are examples of conventional cooling towers.

In a first example of conventional cooling towers, the cooling section is a transport mat, on which the printed products are transported upward along a spiral path in a first tower and are subsequently transported downward along another spiral path in a second, adjacent tower. This is a comparatively space-saving design, but is disadvantageous in that much machine timing between different processing sections is lost and interferes with the further processing of the printed products.

In a second example of conventional cooling towers, a layer lift that operates on the basis of a so-called "paternoster principle" is used, wherein a specific number of deposit trays are arranged along a conveying arrangement and at least one printed product is placed onto each deposit tray. The printed products placed on deposit trays are initially conveyed upwardly and then downwardly. The machine timing is maintained with this type of operation. The disadvantage of this design is that, for a fast-running perfect binder, an extremely high tower of several meters in height, is required to gain the required cooling time. In addition, each deposit tray turns over at the top turning point and changes the orientation of the printed product. Such changes are undesirable in many cases.

SUMMARY OF THE INVENTION

It is an object of the invention to create a conveying arrangement that avoids the previously mentioned disadvantages.

It is also a further object of the invention to provide a conveying arrangement of the type first mentioned above which requires little space and loses no or little machine timing.

The above and other objects are achieved by a conveying arrangement for processing printed products, comprising a conveying section, a plurality of deposit trays on which the printed products are transported along the conveying section, the conveying section having an intake area where the printed products are fed to the deposit trays and a delivery area at an end region of the conveying section where the printed products are removed from the deposit trays, and a control mechanism for controlling a distance between respectively adjacent deposit trays in the intake area based on a thickness of the printed products.

The conveying arrangement according to the invention is not limited to being used as a cooling section and can be used for conveying printed products in a production and processing operation, for example, as a buffer section for printed products.

With a conveying arrangement according to the invention, the spacing between the deposit trays can be adjusted to adapt to the respective thickness of the printed products. The conveying arrangement can be designed to operate precisely at the maximum printing capacity, such that it never operates over capacity or under capacity despite the printed products having different thickness and/or different formats. The thickness and format differences of printed products can optionally change within a row of successive printed products, which is particularly advantageous for a so-called "finishing on demand" operation, where different types of printed products are generated successively with a digital printer while the printer is operating at a constant printing capacity. With the conveying arrangement according to the invention, a constant conveying time and/or a constant cooling time, in the case of a cooling section, can be achieved with a constant printing capacity using the same conveying section, wherein the format and thickness of a product can vary. In the case of a cooling section, printed products of different thicknesses can be cured during the same optimum cooling time.

According to one exemplary embodiment of the invention, the spacing is respectively adjusted by inserting a deposit tray from a deposit tray magazine located below the conveying section into the conveying section. This results in a particularly cost-effective and operationally safe design. According to a second exemplary embodiment of the invention, the deposit trays are respectively removed from a deposit tray magazine located at an end of the conveying section. In both exemplary embodiments, a displacement device can be used to push the deposit trays from the magazine and make them available for conveyance along the conveying section. According to the second exemplary embodiment of the invention, the deposit trays are transported with a lifting device to the conveying section, wherein the desired spacing is adjusted in the process.

With any of the embodiments of the conveying arrangement according to the invention, the conveying arrangement can function as a cooling section or as a buffer section. However, other uses are conceivable as well.

BRIEF DESCRIPTION OF THE DRAWINGS

The foregoing description of the invention will be apparent from the following, more particular description of embodiments of the invention, as illustrated in the accompanying drawings, wherein like reference numbers generally indicate identical, functionally similar, and/or structurally similar elements.

DETAILED DESCRIPTION OF THE INVENTION

Figure 1:
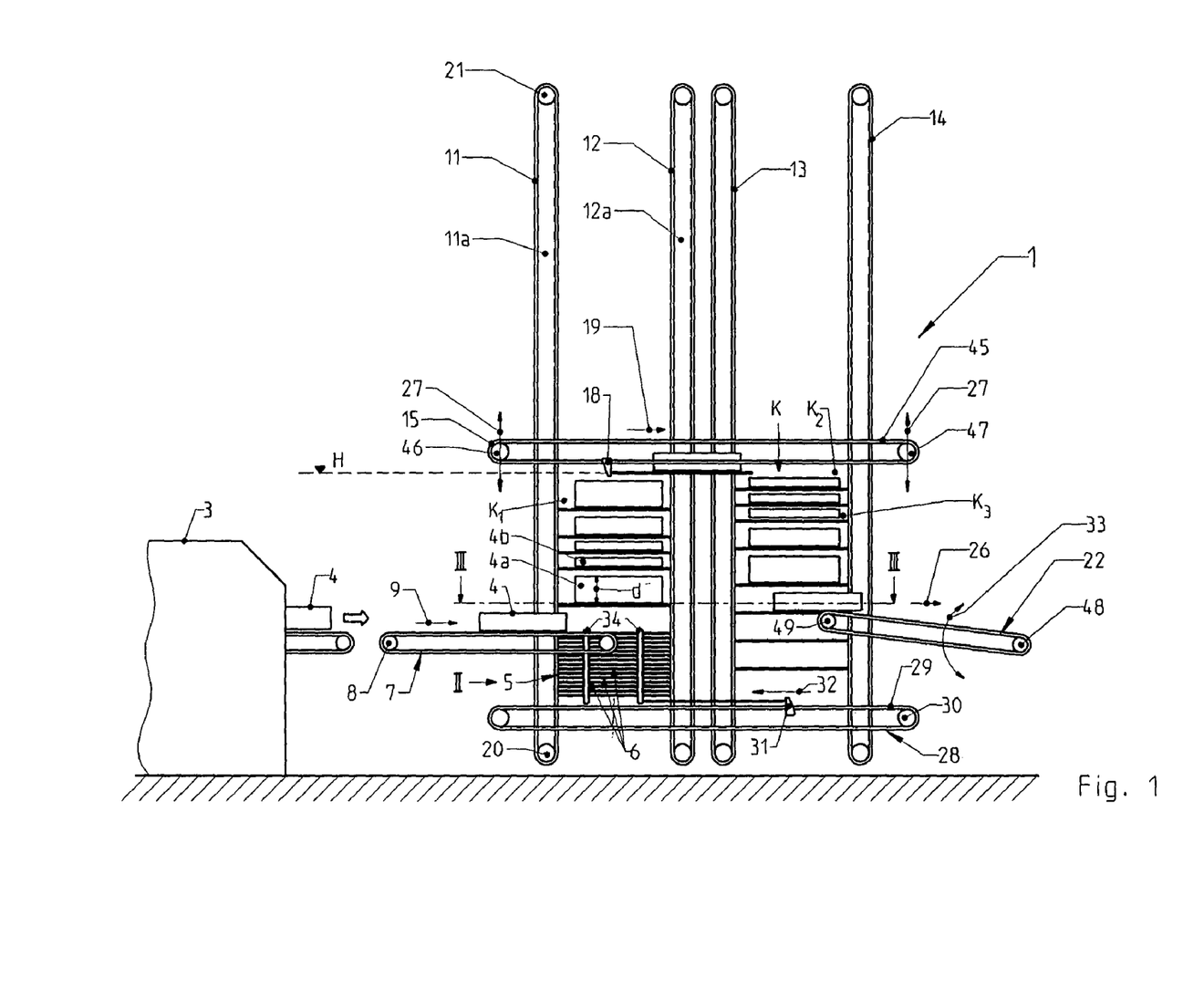
FIG. 1 is a schematic view of a conveying arrangement according to a first exemplary embodiment of the invention.

FIG. 1 depicts a conveying arrangement 1 having an intake area 7 for supplying printed products 4 to a conveying section K in the direction of an arrow 9. The printed products 4, for example, are perfect bound books and magazines which are taken over from, for example, a perfect binder 3, which can be any conventionally known perfect binder. Alternatively, the printed products 4, can be loose sheet stacks, thread-stitched stacks or brochures, and the perfect binder 3 can be replaced by any appropriate binder or paper feeder for supplying the respective printed products 4. In a digital printer, stacks of sheets for the printed products 4 can be printed with a commonly known "on-demand" technique, and digital printing machines may vary considerably from one to another, especially, with respect to the thickness of printed products. Thick printed products 4a and thin printed products 4b are depicted in FIG. 1, wherein any sequence of the thick and thin printed products 4a–b can be used. For example, a large series of thick printed products 4a only or thin printed products 4b only can be processed in one printing order, or a small series of sequentially alternating thick printed products 4a and thin printed products 4b can be processed. Throughout the processing of a printing order, the printing output of the digital printer can remain substantially constant. The frequency at which each stack of the thin printed products 4b accumulates is much higher than that of the thick printed products 4a.

Figure 2:
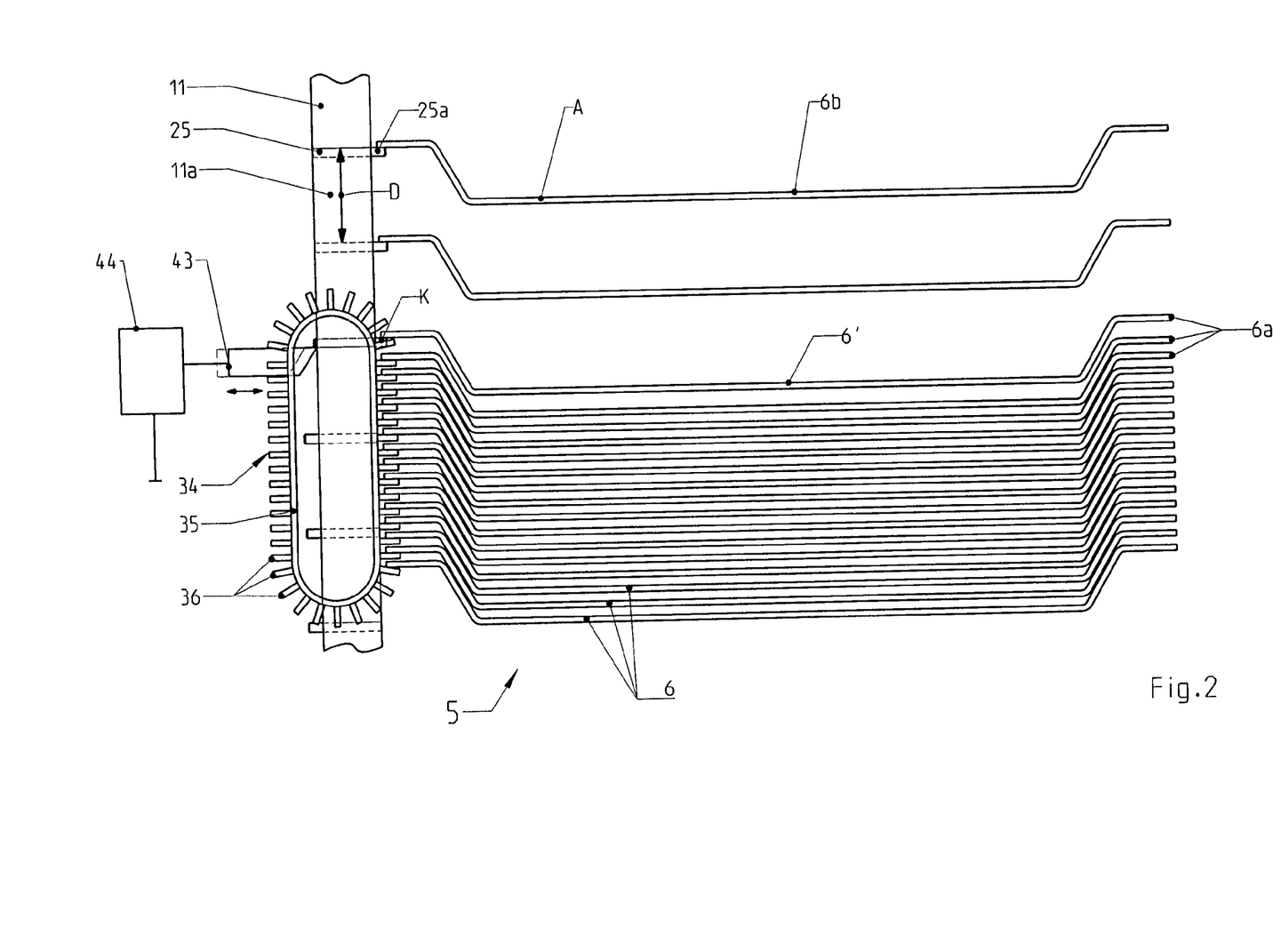
FIG. 2 is a partial view of the conveying arrangement in FIG. 1, as seen in the direction of an arrow II.
Figure 3:
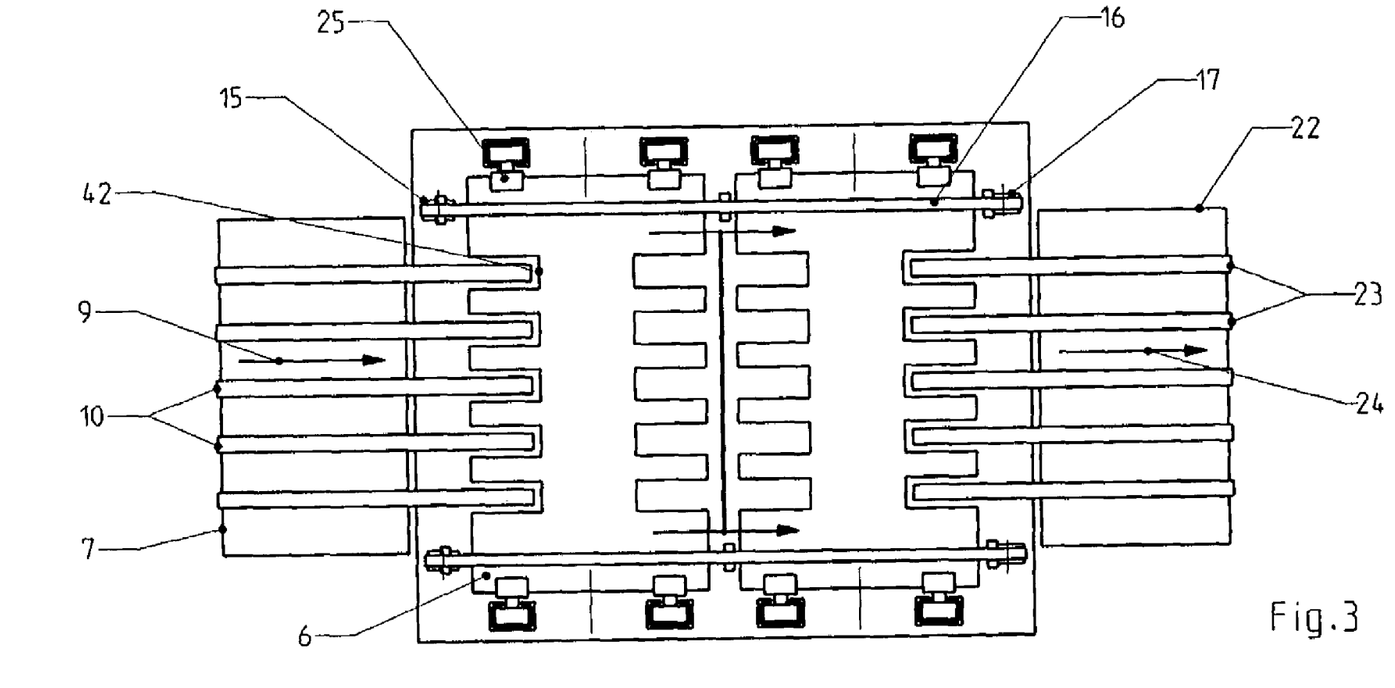
FIG. 3 is a cross sectional view of the conveying arrangement in FIG. 1 as seen along the line III—III.

In the intake area 7, each stack of printed products 4 is individually pushed onto a respective deposit tray 6 by several transport belts 10 shown in FIG. 3, which are operated by a joint driving roller 8 shown in FIG. 1. The deposit trays 6 are plate-shaped as depicted in FIG. 2 and each side is initially slanted upwardly and then extends horizontally outwardly to form an edge 6a. According to FIG. 2, an upper deposit surface 6b extends horizontally. According to FIG. 3, the deposit trays 6 are provided with recesses 42, each of which engages a respective transport belt 10.

Prior to receiving the printed products 4 in FIG. 1, the deposit trays are positioned in a deposit tray magazine/stack 5, which is arranged below a vertical belt section K1 in the region of the intake area 7. According to FIGS. 1 and 2, the deposit tray magazine 5 has at least two lifting devices 34, arranged at a distance to each other on opposite sides of the deposit trays (for a total of at least four lifting devices), each lifting device 34 being essentially formed by an endless conveying belt 35 and a drive mechanism that is not shown herein. Evenly spaced, projecting cams 36 shown in FIG. 2 are attached along the outside of the endless belt 35 so that the whole structure forms a lifting cog. The deposit trays 6 are respectively lifted along an edge 6a by the lifting devices 34. The lifting devices 34 can move the complete deposit tray magazine 5 upward and, according to FIG. 2, a top deposit tray 6' can be lifted up slightly and readied for further transport.

The raised top deposit tray 6' is then transported further with two lifting means 11 and 12 as shown in FIG. 1, which are provided with endless belts 11a and 12a, respectively, that are fitted around rollers 21, respectively. The belts 11a and 12a are each provided with evenly spaced horizontally oriented support elements 25 shown in FIGS. 2 and 3 that can be displaced horizontally with an adjustment means 43 shown in FIG. 2, which can be, e.g., a pneumatic cylinder. The horizontal displacement of the support elements 25 is controlled by a control mechanism 44 as shown in FIG. 2. In an active position, the support elements 25 have an inner end 25a that lifts and holds the edge 6a of a deposit tray 6, as shown in the top half of FIG. 2. In an inactive position, as shown in the bottom half of FIG. 2, the ends 25a of support elements 25 are in a pulled-back position. The spacing/distance D shown in FIG. 2 represents a minimum spacing between two adjacent support elements 25. If each support element 25 is pushed into an active position with the aforementioned adjustment means 43, then a minimum spacing/distance D exists between all adjacent deposit trays 6 that are lifted up and inserted into the section K. If every other support element 25 is activated, then the distance between two adjacent deposit trays 6 is equal to 2D. Thus, all multiples of the minimum distance D are possible as a distance between two adjacent trays 6 that are inserted into the section K by adjusting the state (i.e., active or inactive) of the support element 25 with the control mechanism 44 and the adjustment means 43. The distance between adjusted trays can be, for example, D, 2D, 3D, etc.

The control mechanism 44 shown in FIG. 2 is in turn connected to the perfect binder 3 shown in FIG. 1 and adjusts the active and inactive states of the support elements 25 so that the spacing between two deposit trays 6 at the intake area 7 is adapted to the thickness d shown in FIG. 1 of the printed product 4 to be placed in-between. For example, for a thin printed product 4b, the distance between the two deposit trays receiving the product in-between can be D, while for a thick printed product 4a, the distance can be 3D or 4D. Thus, each distance between adjacent deposit trays can be a multiple of D. Alternatively, a design is also conceivable where the distances between adjacent deposit trays 6 can be adjusted continuously and not necessarily in discrete units.

In the vertically ascending section K1 (FIG. 1), which can be a cooling section, the printed products 4 are transported on a deposit tray 6 vertically upward, wherein the transporting speed can remain constant. Once a horizontally conveying height H is reached, as indicated with a dashed line in FIG. 1, the printed products 4 are respectively positioned in the horizontal section K2, wherein the horizontal transporting speed can be consistent. The printed products 4 can be displaced by a displacement device 15 in a horizontal direction from the ascending section K1 to a descending section K3. An endless belt 45 fitted around a driving roller 46 and a deflection roller 47 and having at least one carrier plate 18 is used for the displacement. In FIG. 1, the transporting direction of the printed products 4 in the horizontal section K2 is indicated with an arrow 19. The height of the displacement device 15 can be adjusted in the directions of a double arrow 27 as shown in FIG. 1. The ascending and descending sections K1 and K3 and thus the complete conveying section K can be extended or shortened in this way. In addition, the total number of the deposit trays 6 in the moving sections K1–3 and the total number of printed products 4 deposited thereon can also be increased or reduced by adjusting the height of the displacement device 15.

In the region of the descending section K3, the deposit trays 6 containing the printed products 4 are transported vertically downward with the aid of lowering means 13 and 14. The lowering means 13 and 14 can have a design similar to the lifting means 11 and 12. The deposit trays 6 are preferably also held by support elements 25 in FIGS. 2 and 3, which hold a deposit tray 6 from the horizontal section K2 in FIG. 1 as soon as the carrier plate 18 in FIG. 1 of the displacement device 15 completely pushes the deposit tray onto the descending section K3. The spacing for the ascending section K1 is retained in the descending section K3. Thus, the spacing in the downward moving section K3 is adapted to the thickness of the printed products 4.

Once placed in the descending section K3 in FIG. 1, the printed products 4 are transported downwardly until they reach a delivery area 22 having a similar configuration to the intake area 7 and having a plurality of transport belts 23 as shown in FIG. 3. In FIG. 1, the height of a deflection roller 49 of the delivery section 22 can be adjusted by swiveling the arrangement of the deflecting roller 49 and transport belts with respect to the driving roller 48 as shown by a double arrow 33. The printed products 4 are successively picked up at the delivery area 22, removed from the conveying section K in the direction of an arrow 26 and supplied to another processing device, for example, a trimming machine (not depicted). When leaving the conveying section K, the glue on the printed products 4 has hardened and has, for example, the desired cutting firmness. The machine timing of the perfect binder 3 can remain substantially the same in the region of the conveying arrangement 1. Thus, the printed products can be processed further, particularly in a trimming machine, while maintaining the machine timing of the perfect binder 3 in the conveying arrangement 1. The glue is preferably cooled or dried in the conveying arrangement under prevailing environmental conditions.

After the printed products 4 are delivered in the delivery area 22, the deposit trays 6 are empty and are further transported downwardly by the lowering means 13 and 14 to another horizontal displacement device 28. The displacement device 28 has a similar design to the displacement device 15 and is provided with at least one endless belt 29 having at least one carrier plate 31 for moving the deposit trays 6 in the direction of an arrow 32 toward the deposit tray magazine 5. Once the deposit trays 6 are placed in the area of the deposit tray magazine 5, they are respectively held by the lifting device 34 and inserted into the deposit tray magazine 5 from below. Once lifted and held by the lifting device 34, the deposit trays 6 are moved from the bottom to the top of the deposit tray magazine 5 in the order they were received until they are lifted by the lifting means 11 and 12 and are inserted into the ascending section K1 from below, as previously described. The spacing between adjacent deposit trays is adjusted to adapt to the thickness d of the printed products 4, as explained before. Thus, the above-described cycle of moving the printed products 4 in the conveying arrangement 1 can be repeated continuously.

Figure 4:
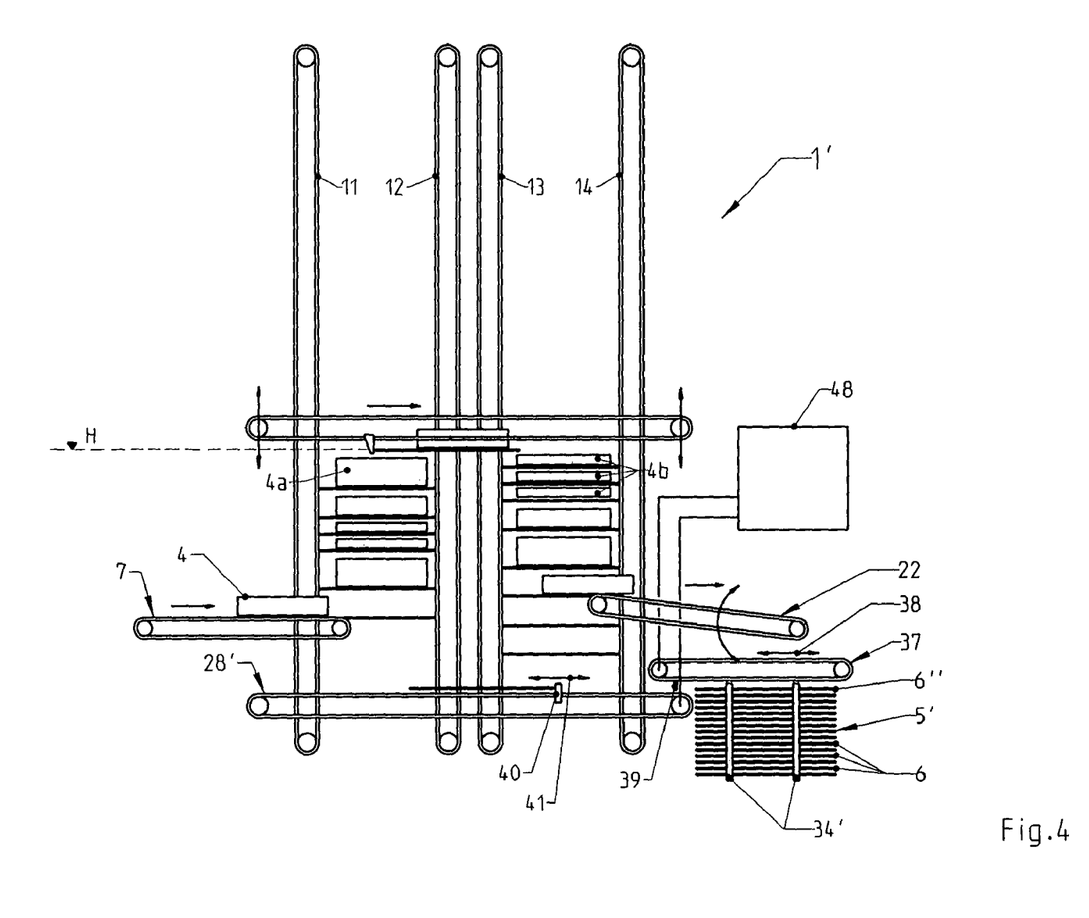
FIG. 4 is a schematic view of a second exemplary embodiment of the conveying arrangement according to the invention.

FIG. 4 shows a second embodiment of a conveying arrangement 1', in which the deposit tray magazine formation differs from that for the above-explained conveying arrangement 1. The conveying arrangement 1', for example, is a cooling tower or a buffer section and comprises a deposit tray magazine 5' that is positioned below the delivery area 22. A traction means 37 is arranged above the deposit tray magazine, which has at least one driving cam 39 for moving an upper deposit tray 6" of the deposit tray magazine 5' to the region of a displacement device 28'. The conveying direction of the traction means 37 can be reversed, so that the driving cam 39 can take over a deposit tray from the displacement device 28' and supply it to the deposit tray magazine 5' by reversing the conveying directions of the traction means 37 and the displacement device 28'. The conveying directions of the traction means 37 and the displacement device 28' are indicated with arrows of the double arrows 38 and 41. For example, the empty deposit trays 6 are deposited with the lowering means 13 and 14 onto the displacement device 28'. The deposit trays 6 can then be supplied to the lifting means 11 and 12 or the deposit tray magazine 5' selectively.

If the deposit trays 6 from the lowering means 13 and 14 are supplied to the lifting means 11 and 12, then the previous spacing between adjacent deposit trays is maintained. If a deposit tray 6 from the lowering means 13 and 14 is supplied to the deposit tray magazine 5', the spacing is increased by a minimum distance D. If a deposit tray from the deposit tray magazine 5' is supplied to the lifting means 11 and 12, the spacing is reduced by the distance D. If two adjacent deposit trays 6 are at a minimum distance D to each other, no other deposit tray 6 can be inserted in-between. The traction means 37 as well as the displacement device 28' are controlled with a control mechanism 48. The control mechanism 48 respectively computes the required spacing and controls the displacement device 28' to move the deposit trays 6 into the upward moving section or into the deposit tray magazine 5'. In the deposit tray magazine 5', the deposit trays 6 are then transported upwardly with the lifting device 34', as explained before with respect to the lifting device 34 of FIG. 1. In addition, the lifting device 34 can also transport the deposit trays downwardly. Thus, for the conveying arrangement 1', the spacing can be adjusted to automatically adapt to the thickness of the printed products 4. The number of deposit trays in the stack 5' can change as the control mechanism adjusts the spacing. For example, when a series of thin printed products 4b is cooled in the conveying arrangement 1', the deposit tray magazine 5' is left with few deposit trays 6. Deposit trays 6 can also be added to or removed manually from the deposit tray magazine 5'.

Figure 5:
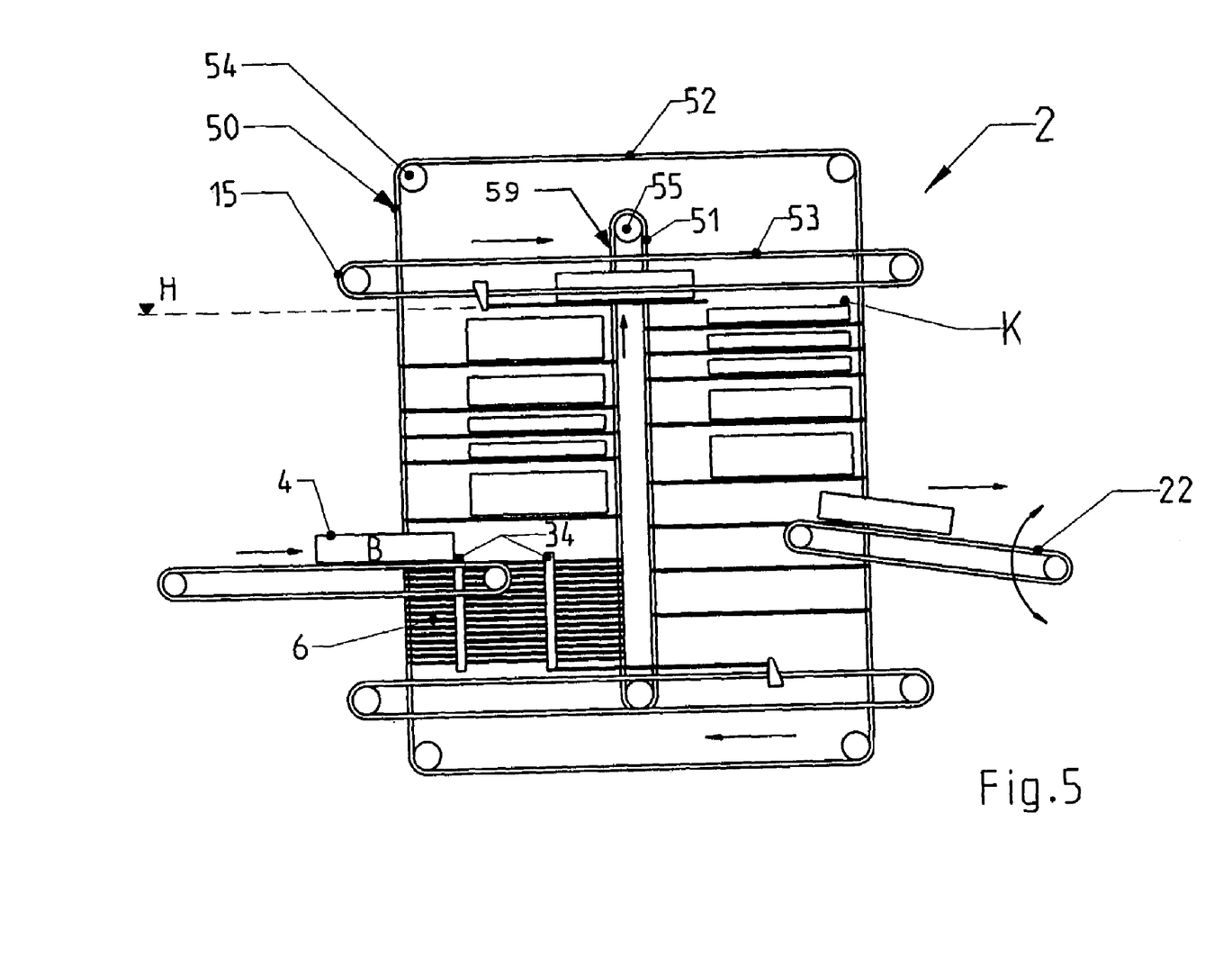
FIG. 5 is a schematic view of a third exemplary embodiment of the conveying arrangement according to the invention.

FIG. 5 shows a conveying arrangement 2, preferably a cooling tower, which differs from the conveying arrangement 1 of FIG. 1 in the way the printed products 4 are transported in the area of the conveying section K. An outer endless traction means 50 and an inner endless traction means 59 are provided for transporting the printed products 4. Both traction means 50 and 59 respectively are provided with endless belts 52 and 51, respectively that are fitted around four rollers 54 and two rollers 55, respectively. The belts 52 and 51 are also provided with support elements that are not shown but are similar to the support elements 25 of FIG. 2, wherein the support elements of the belts 52 and 51 are controlled as previously described with respect to the support elements of FIG. 2. Otherwise, the conveying arrangement 2 operates in the same way as the conveying arrangement 1 of FIG. 1.

Figure 6:
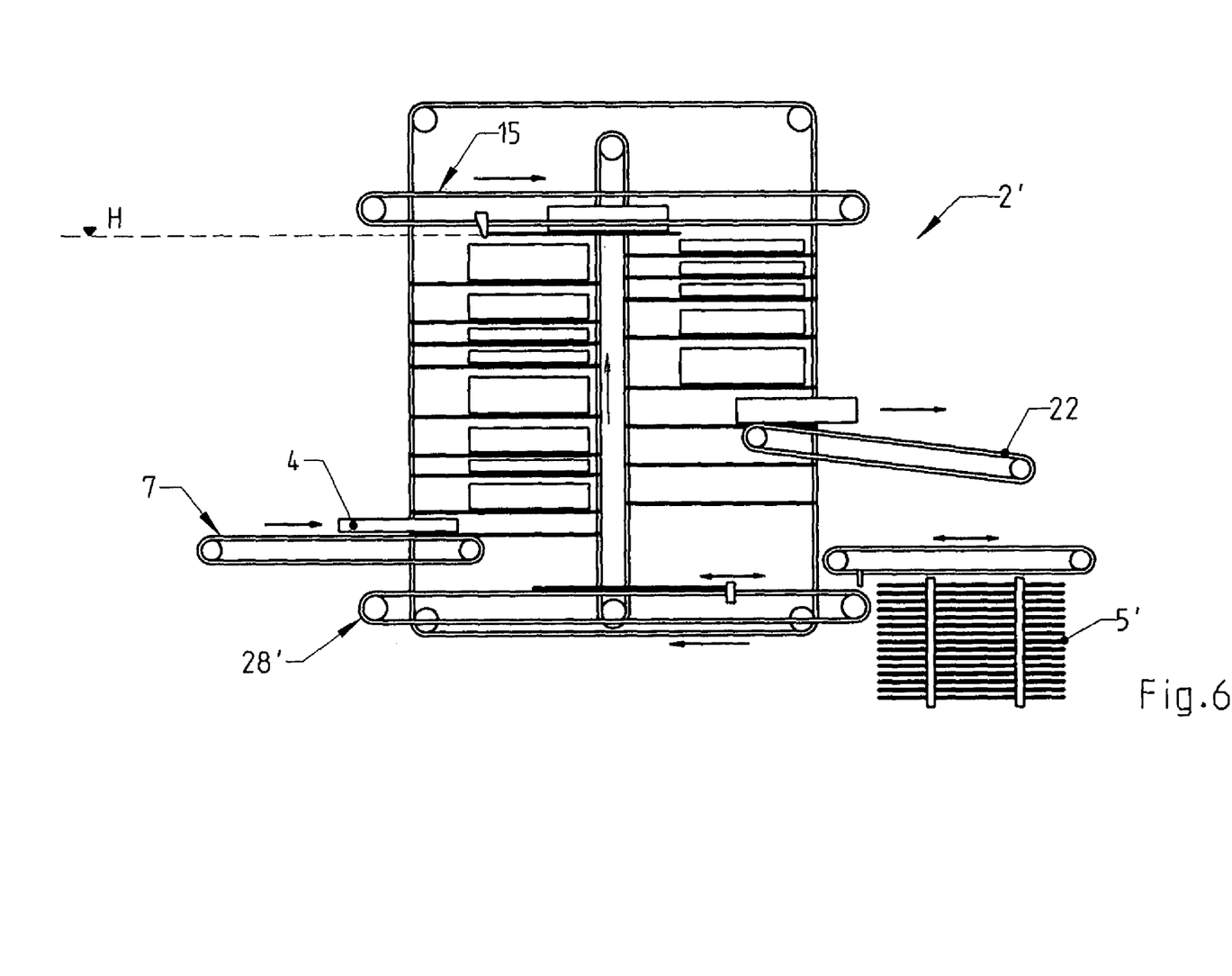
FIG. 6 is a schematic view of a fourth exemplary embodiment of the conveying arrangement according to the invention.

In FIG. 6, a conveying arrangement 2' is the same as the conveying arrangement of FIG. 5 except for the design with a deposit tray magazine 5' arranged to the side and below a delivery area 22, as in FIG. 4.

The embodiments shown in FIGS. 5 and 6 distinguish themselves by being structurally particularly simple and nevertheless operationally safe for transporting the printed products 4. They are particularly suitable for being used as cooling sections or drying sections to dry, for example, a dispersion glue. The embodiments shown in FIGS. 1 to 4 are particularly suitable as buffer sections because of the adjustable conveying section, but can also be used as cooling sections or drying sections. As a buffer section, the conveying arrangements of FIGS. 1–6 can take over finished printed products, e.g. books or thread-stitched magazines, at one end of a system and deliver these, for example, to the shipping department.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A conveying arrangement for processing printed products, comprising:
   conveying section;
   a plurality of deposit trays on which the printed products are transported along the conveying section, the conveying section having an intake area where the printed products are fed to the deposit trays and a delivery area at an end region of the conveying section where the printed products are removed from the deposit trays;
   a deposit tray magazine in which the deposit trays are arranged one above the other, wherein the deposit tray magazine is arranged for making the deposit trays available for accommodating a printed product at the intake area of the conveying section;
   a displacement device connected at the end region of the conveying section for supplying deposit trays to the deposit tray magazine; and
   a control mechanism for controlling a distance between respectively adjacent deposit trays in the intake area based on a thickness of the printed products, the thickness being defined by a vertical direction of conveyance.

2. The conveying arrangement according to claim 1, wherein the deposit trays are insertable from below into the conveying section for adjusting the distances between adjacent trays.

3. The conveying arrangement according to claim 1, wherein the deposit tray magazine is arranged at a starting point of the conveying section.

4. The conveying arrangement according to claim 1, wherein the deposit tray magazine is arranged to be supplied from below.

5. The conveying arrangement according to claim 1, wherein the conveying section includes an ascending conveying section, a parallel descending conveying section, and a further displacement device arranged at a conveying thickness of the conveying section for displacing respectively one deposit tray in approximately a horizontal direction from the ascending conveying section to the parallel descending conveying section.

6. The conveying arrangement according to claim 5, wherein the further displacement device is moveable vertically to extend or shorten a conveying distance.

7. The conveying arrangement according to claim 1, wherein the deposit tray magazine is arranged at the end region of the conveying section.

8. The conveying arrangement according to claim 7, wherein the displacement device is connected between the deposit tray magazine and a start of the conveying section.

9. The conveying arrangement according to claim 7, wherein the deposit tray magazine is arranged to be supplied from its top.

10. The conveying arrangement according to claim 1, wherein the control mechanism includes a lifting device arranged for lifting the deposit trays vertically upward from the deposit tray magazine.

11. The conveying arrangement according to claim 10, wherein the deposit tray magazine is arranged below the intake area.

12. The conveying arrangement according to claim 10, wherein the lifting device includes controllable support elements for adjusting the spacing of the deposit trays.

13. The conveying arrangement according to claim 12, wherein the support elements are displaceable between an active position and an inactive position.

14. The conveying arrangement according to claim 13, wherein when the support elements are in the active position they respectively grip one edge of one deposit tray from below.

* * * * *